(12) United States Patent
Banga et al.

(10) Patent No.: US 8,799,691 B2
(45) Date of Patent: Aug. 5, 2014

(54) HIERARCHICAL POWER MANAGEMENT

(75) Inventors: Gaurav Banga, Cupertino, CA (US);
Kaushik Barde, Sunnyvale, CA (US);
Anand Pandit, Beaverton, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 827 days.

(21) Appl. No.: 12/544,900

(22) Filed: Aug. 20, 2009

(65) Prior Publication Data

US 2010/0174924 A1    Jul. 8, 2010

Related U.S. Application Data

(60) Provisional application No. 61/204,613, filed on Jan. 7, 2009.

(51) Int. Cl.
*G06F 1/26* (2006.01)
(52) U.S. Cl.
USPC .......................................... 713/320
(58) Field of Classification Search
USPC .............. 710/260–269; 713/300, 320, 330
See application file for complete search history.

(56) References Cited

U.S. PATENT DOCUMENTS

| | | | | |
|---|---|---|---|---|
| 6,167,511 A | * | 12/2000 | Lewis | 713/2 |
| 6,219,742 B1 | * | 4/2001 | Stanley | 710/260 |
| 7,058,831 B2 | * | 6/2006 | Cheok et al. | 713/320 |
| 7,543,166 B2 | * | 6/2009 | Zimmer et al. | 713/310 |
| 7,743,389 B2 | * | 6/2010 | Mahalingam et al. | 719/321 |
| 7,877,747 B2 | * | 1/2011 | Magenheimer | 718/1 |
| 2004/0243534 A1 | * | 12/2004 | Culter et al. | 707/1 |
| 2007/0006227 A1 | * | 1/2007 | Kinney et al. | 718/1 |
| 2007/0061441 A1 | * | 3/2007 | Landis et al. | 709/224 |
| 2010/0115315 A1 | * | 5/2010 | Davis et al. | 713/323 |
| 2010/0153765 A1 | * | 6/2010 | Stemen et al. | 713/340 |
| 2010/0174925 A1 | * | 7/2010 | Barde | 713/300 |
| 2010/0306560 A1 | * | 12/2010 | Bozek et al. | 713/320 |
| 2011/0055602 A1 | * | 3/2011 | Kamay et al. | 713/320 |

OTHER PUBLICATIONS

Power-Aware Scheduling of Virtual Machines in DVFS-enabled Clusters, Laszewski et al., IEEE, 2009.*
Xen 4.0 Data Sheet, Xen 4.0 Enterprise & Cloud Hypervisor, Xen. org, undated.*

* cited by examiner

*Primary Examiner* — Khanh Dang

(57) ABSTRACT

Methods, systems, apparatuses and program products are disclosed for providing power/energy control.
HPM (Hierarchical Power Management) systems provide for and improve on the power management support beyond what is available in current PC notebooks and desktops.

15 Claims, 5 Drawing Sheets

FIG.3    200

HIERARCHICAL POWER MANAGEMENT

RELATED APPLICATION

This application claims the benefit of U.S. Provisional Application Ser. No. 61/204,613, filed on Jan. 7, 2009.

FIELD OF THE INVENTION

The present invention generally relates to personal computers and devices sharing similar architectures and, more particularly, to a system and method for managing power and energy within those devices.

BACKGROUND OF THE INVENTION

Modernly, power management support is available in current PC (Personal Computer) notebooks and desktops conformant with ACPI (Advanced Configuration Power Interface) techniques which are well known in the art. ACPI based implementations are a form of OSPM (Operating System Power Management or sometimes Operating System Power Management Policy).

OSPM uses ACPI services which are based on BIOS (Basic Input-Output System) control. Some (typically older) ACPI services are linked to Fixed HW (hardware) registers in I/O (input-output) address space—as contrasted with MM (memory mapped) address space. FFH (functional fixed hardware) is a combination of hardware with software and firmware that, taken together, provides a number of services in conformance with the ACPI specification. Taken together, FFH and the older Fixed HW registers are termed ACPI FHF (Fixed Hardware Feature(s)). It is significant that, per the ACPI specification, ACPI FHF provides not just a specified access mechanism but also specified power management services. Though the power management features are necessarily realized in various ways on various hardware platforms, nonetheless ACPI FHF provides a core set of power management services, features and methods through a level of abstraction.

The fixed hardware programming model requires hardware registers to be defined at particular address locations, and in contrast—the generic hardware programming model inherent in the use of FFH to provide services allows hardware registers (called Generic Registers) to reside in almost any address selected from within most address spaces and provides system OEMs (Original Equipment Manufacturers) with a wide degree of flexibility in the implementation of specific functions embodied in hardware. If necessary, OSPM may direct accesses to the fixed hardware registers, but OSPM relies on OEM-provided ACPI Machine Language (AML) code to access generic hardware registers. It is well known in the art how to produce AML codes from ASL (ACPI Source Language) including descriptions of hardware configurations and more.

Generic Registers and their usage are documented in the ACPI specification. Thus, ACPI FHF provides a standardized means of providing Power Management services for use by OSPM.

However, broadly speaking, the ACPI OSPM does not take account of, nor provide for virtualized OS (operating systems), two or more of which may coexist in a hypervisor environment. Support for rich OS features in multiple VMs (Virtual Machines) is limited. This situation provides an implementation challenge (and opportunity) for hypervisors since the underlying assumption made by a typical single OS that it may safely and properly take overarching control of the hardware resources (especially as related to power management) is thereby invalidated.

Moreover, it will never be entirely satisfactory for the power and energy environment of the underlying platform to be virtualized to each OS (operating system) nor for each OS to be allowed mere pass-through access to hardware. In the former case OS efforts at power and energy management may be wasted and in the latter case the two operating systems can be expected to interfere one with the other. For example it would clearly be at least wasteful if not error inducing for a first OS to spin down a disk drive in order to save power while it is in actual use by a second OS for reading and/or writing data.

A need exists for an implementation approach that provides each of transient, pass-through and emulated facilities for power management and which incorporates and uses any and all of these according to need.

SUMMARY OF THE INVENTION

The disclosed invention includes, among other things, methods and techniques for providing power/energy controlling techniques to address the issues described above. Thus, HPM (Hierarchical Power Management) systems provide for and improve on the power management support beyond what is available in current PC notebooks and desktops.

According to an aspect of the present invention, an electronic device includes a controller, for example a processor, and a memory that is coupled to the processor. The memory includes a plurality of instructions that when executed by the processor, cause to processor to perform power management operations, for example, maintaining virtualized Functional Fixed Hardware codes responsive to device interrupts and based on BIOS (Basic Input-Output System) firmware codes.

Virtualized Functional Fixed Hardware codes, for example modified DSDT (Differentiated System Description Tables) and SSDTs (Secondary Subsystem Description Tables) are provided to a first operating system and pass-through access is provided for non-virtualized Functional Fixed Hardware codes, for example native ACPI DSDT, to a second operating system. The first and second operating systems may be under joint or several hypervisor control.

An advantage provided by the present invention is that it enables multiple operating systems to coexist and operate in effective simultaneity without loss of effective power management and without either OS being shut out from materially participating in that power management.

Another advantage provided by the present invention is that it provides for hypervisor use without significant loss of ACPI functioning.

According to an aspect of the present invention, a method of executing a program includes similar features to the system embodiment but which may be adapted for programmatic implementation of more generalized computing platforms, such as PCs.

BRIEF DESCRIPTION OF THE DRAWINGS

The aforementioned and related advantages and features of the present invention will become better understood and appreciated upon review of the following detailed description of the invention, taken in conjunction with the following drawings, which are incorporated in and constitute a part of the specification, illustrate an embodiment of the invention and in which.

For convenience in description, identical components have been given the same reference numbers in the various drawings.

DETAILED DESCRIPTION OF THE INVENTION

The description of well-known components is not included within this description so as not to obscure the disclosure or take away or otherwise reduce the novelty of the present invention and the main benefits provided thereby. An exemplary embodiment of the present invention will now be described with reference to FIGS. 1-6.

Figure 1:
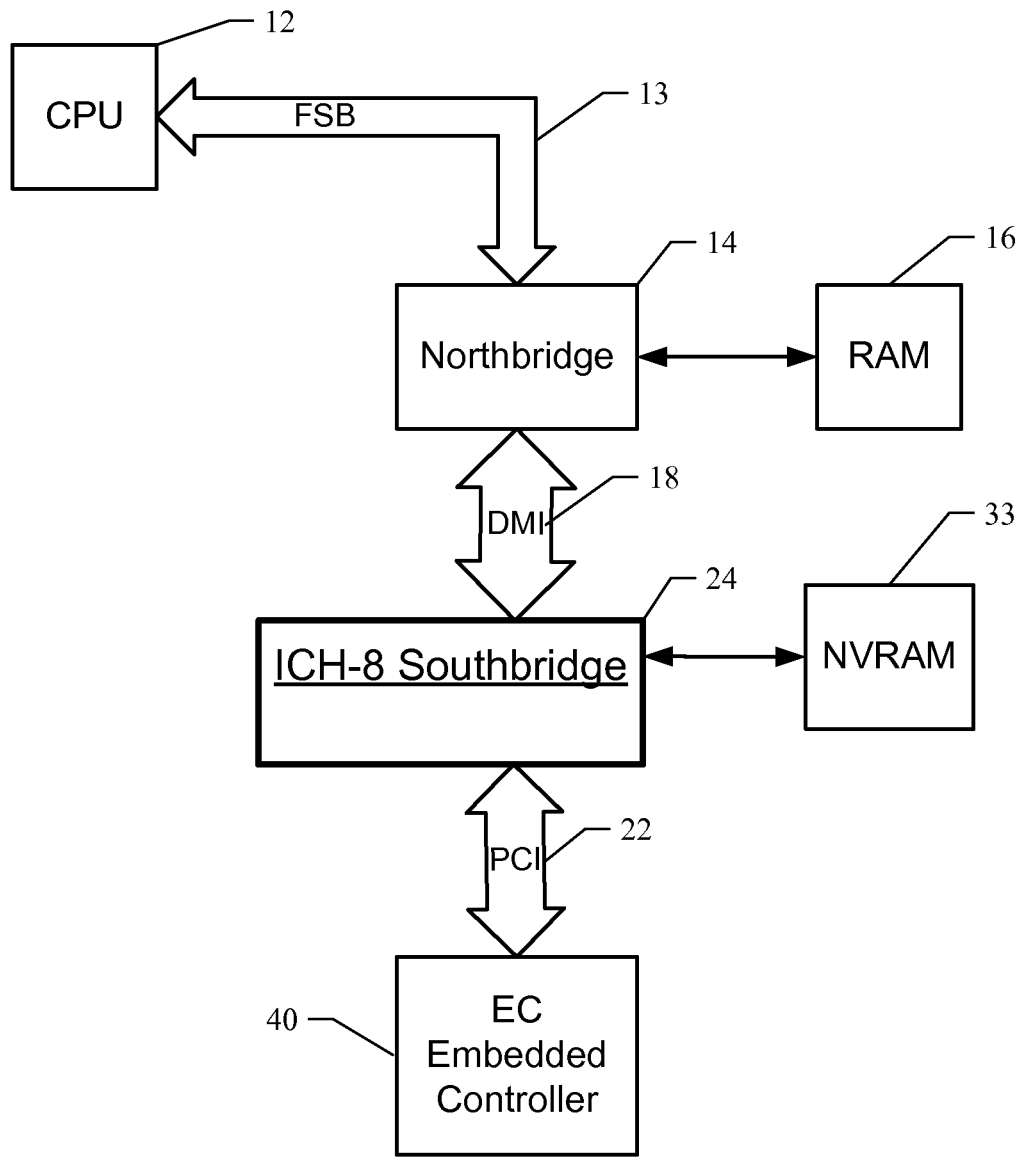
FIG. 1 is a schematic block diagram of an electronic device configured to implement the interrupt logic functions according to an exemplary embodiment of the present invention.

FIG. 1 is a schematic block diagram of an electronic device configured to implement the interrupt logic functions according to the present invention. The exemplary electronic device 10 is implemented as a personal computer, for example, a desktop computer, a laptop computer, a tablet PC or other suitable computing device. Although the description outlines the operation of a personal computer, it will be appreciated by those of ordinary skill in the art, that the electronic device 10 may be implemented as other suitable devices for operating or interoperating with the invention. The electronic device 10 may include at least one processor or CPU (Central Processing Unit) 12, configured to control the overall operation of the electronic device 10. Similar controllers or MPUs (Microprocessor Units) are commonplace and may be used in place of the at least one processor 12.

The processor 12 may typically be coupled to a bus controller 14 such as a Northbridge chip by way of a bus 13 such as a FSB (Front-Side Bus). A Northbridge chip 14 typically provides an interface for read-write system memory 16 such as semiconductor RAM (random access memory). FSB 13 may also be used to allow bus controller 14 to control CPU features, such as effective clock rate.

The bus controller (Northbridge chip) 14 may also be coupled to a system data highway 18, for example a DMI (Direct Media Interface) in typical Intel® style embodiments. Coupled to the DMI 18 may be a Southbridge chip 24 such as an Intel® ICH8 (Input/Output Controller Hub type 8) chip. The Southbridge 24 may be connected to a PCI (peripheral component interconnect) bus 22 and an EC (Embedded controller) 40, each of which may in turn be connected to various input/output devices (not shown in FIG. 1), for example, a display, a printer, a keyboard, a mouse, a biometric reader and other suitable devices and combinations thereof. Embedded controllers are well-known in the art. The Southbridge 24 may also be connected to forms of NVRAM (non-volatile read-write memory) 33, such as a Flash Memory and a Disk Drive memory. NVRAM may be used to provide BIOS (Basic Input-Output System) and ACPI firmware and persistent data storage.

Storage recorders and communications devices including data transmitters and data receivers may also be used (not shown in FIG. 1, but see FIGS. 5 and 6) such as may be used for data distribution and software distribution in connection with distribution and redistribution of executable codes and other programs and data that may embody the parts of invention.

Figure 2:
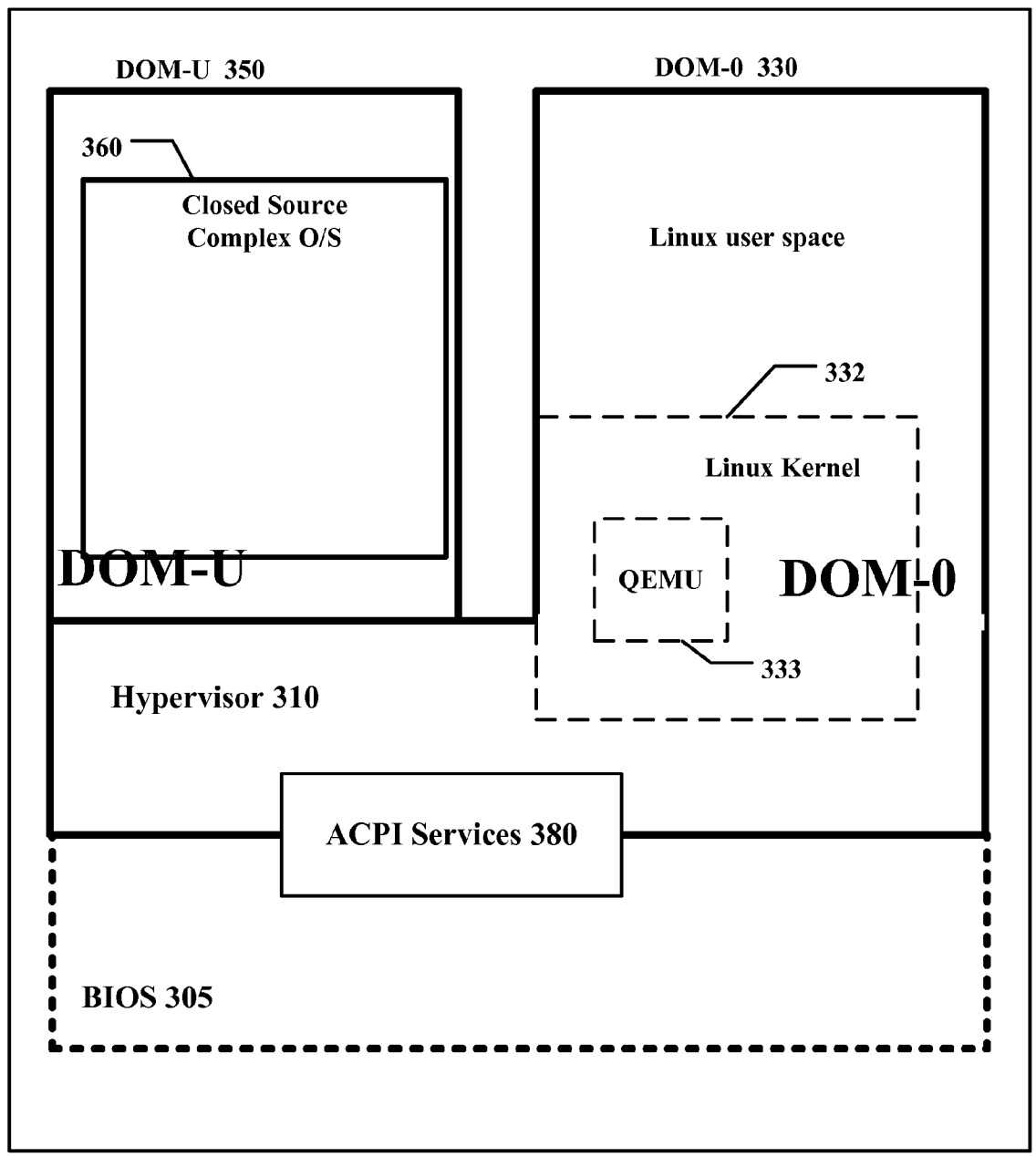
FIG. 2 is a block diagram that shows the architectural structure of a hypervisor-based system in which an exemplary embodiment of the present invention was implemented.

FIG. 2 is a block diagram that shows the architectural structure 300 of a hypervisor-based system in which an exemplary embodiment of the present invention was implemented. Embodiments of the invention may be implemented in a hypervisor environment that may use the services of a BIOS 305. An important part of a typical hypervisor environment is Dom0 330, which (in one embodiment of the invention) is built upon a modified version of a Xen® and/or Linux® software stack. Virtual Machine Dom (Domains) are well-known in the hypervisor arts. Dom0 or Domain Zero (sometimes DOM-0) is a term used in the hypervisor arts to refer to the "privileged domain", which is typically embodied as a VM (Virtual Machine) that has greater privileges than all other domains or VMs (known as DomU for "unprivileged domain").

Within Dom0 may lie a Linux® kernel program 332, upon which applications programs for running on a Linux® kernel may be found. Also within the Linux kernel 332 lies an EMU (I/O emulator subsystem) known as QEMU 333 which is a software or firmware module whose main purpose (or function) is to emulate I/O (Input-Output) operations.

Also running under the control of the hypervisor 310 is the unprivileged domain—DomU 350. Within the DomU 350 may be the Guest OS (operating system) 360. A Guest OS will typically, but not essentially, be a closed-source OS, for example, a version of the Vista® operating system which is a commercial software product of Microsoft Corporation or another suitable operating system.

Embodiments of the present invention may substantially conform to ACPI which describes and prescribes information about configuration and control of platform HW (hardware) components through ACPI's own well-known name space and Control Methods. This information may reside in various tables in AML (ACPI Machine Language) form which is interpreted by OS (operating system) ACPI driver(s) for suitable action. Although, such tables could be organized in separate functional compartments, there still exists substantial cross references within ACPI name space (whose scope is for the entire platform). Also, control methods are executed through interpretation of AML code, which has higher level of abstraction over target I/O operations.

The above factors make virtualization of ACPI functionality challenging. At least partially, as a result, the scope of ACPI implementation in embodiments of the invention at the present stage of development may be focused on PPM (Processor Power Management) and platform Sx State (ACPI Sleep State) control. ACPI functionality for the devices Dx State (ACPI Device State) management may be made available on "pass though" or generic basis in line with the actual mode of operation. ACPI functionality for virtualized subsystem components may also be covered as ACPI implementations that center on virtualization of ACPI Fixed Hardware (I/O) space. Each of these factors is significant in power (and energy) management in ACPI conformant PCs. Platform Sx states and Device Dx states are well-known in the ACPI arts.

In an embodiment of the invention, the enhanced ACPI implementation may center on virtualization of ACPI FHF (Fixed Hardware Features) especially hardware in input-output space and related to power management. ACPI FHF—both Fixed HW address space and especially FFH (Functional Fixed Hardware), are all well defined (in the ACPI specification) and are collectively a primary channel for Platform Sleep state and event notification. Similarly, Processor Power Management ACPI objects may exist on a per-VM (Virtual Machine) basis thus allowing for virtualization and/or multiplexed control of Processor P States (which mostly determine frequency scaling). Processor P States, as well as Platform Sx states and Device Dx states, are well-known in the art.

In an embodiment of the invention, Processor Cx States handling may be implemented in a pass-through or transparent mode. Thus, a processor may be placed under progressively lower power modes pursuant to detection of idling conditions by an OSPM. In such an embodiment of the invention, the actual (hardware) C state of the Processor (as contrasted with a virtualized C state as may be "seen" by OSPM) will usually be independent of which Dom (execution Domain) is active. In a typical embodiment, at a physical or package level that C state may be the highest common C state of any Domain of any of multiple Processor Cores (assuming a multiple core processor is in use). This may require that quiescent (background) Domains be successfully able to detect idle conditions and allow a yield to the lowest C State prevailing.

In an embodiment of the invention, a set of APIs may be defined for control of ACPI features under policy prescription. Thus it becomes possible to interrogate processor frequency/power range and force maximum and minimum constraints for each particular domain.

In particular, a DomU OSPM may request a lower (less power, less speed etc.) State and the hypervisor may virtualize the requested state back to the OSPM to allow it to operate consistently. But hypervisor may implement at a hardware level a different state—typically a more active State desired by the other domain, such as a Linux-based operating system that is active in Dom0.

ACPI Fixed HW space and especially corresponding FFH (Functional Fixed Hardware) codes are typically based on modified versions of hardware state tables as defined in ACPI, for example FADT (Fixed ACPI Description Table) and SSDTs (Secondary Subsystem Description Tables). ACPI Fixed HW space is the primary channel for Platform Sleep state and event notifications. In this sense the modified State tables do not strictly conform to ACPI but may be regarded as a compatible superset thereof which provide for an extended and virtualized implementation of some ACPI tables.

Similarly, Processor Power Management ACPI objects exist allowing for virtualization or multiplexed control of ACPI Processor P States for Frequency scaling. In an embodiment of the invention ACPI Processor C States are implemented in pass-through mode. In pass-through (or pass-thru) operation the underlying state is typically the same as the virtualized state and may or may not be maintained in duplicate by firmware.

Figure 3:
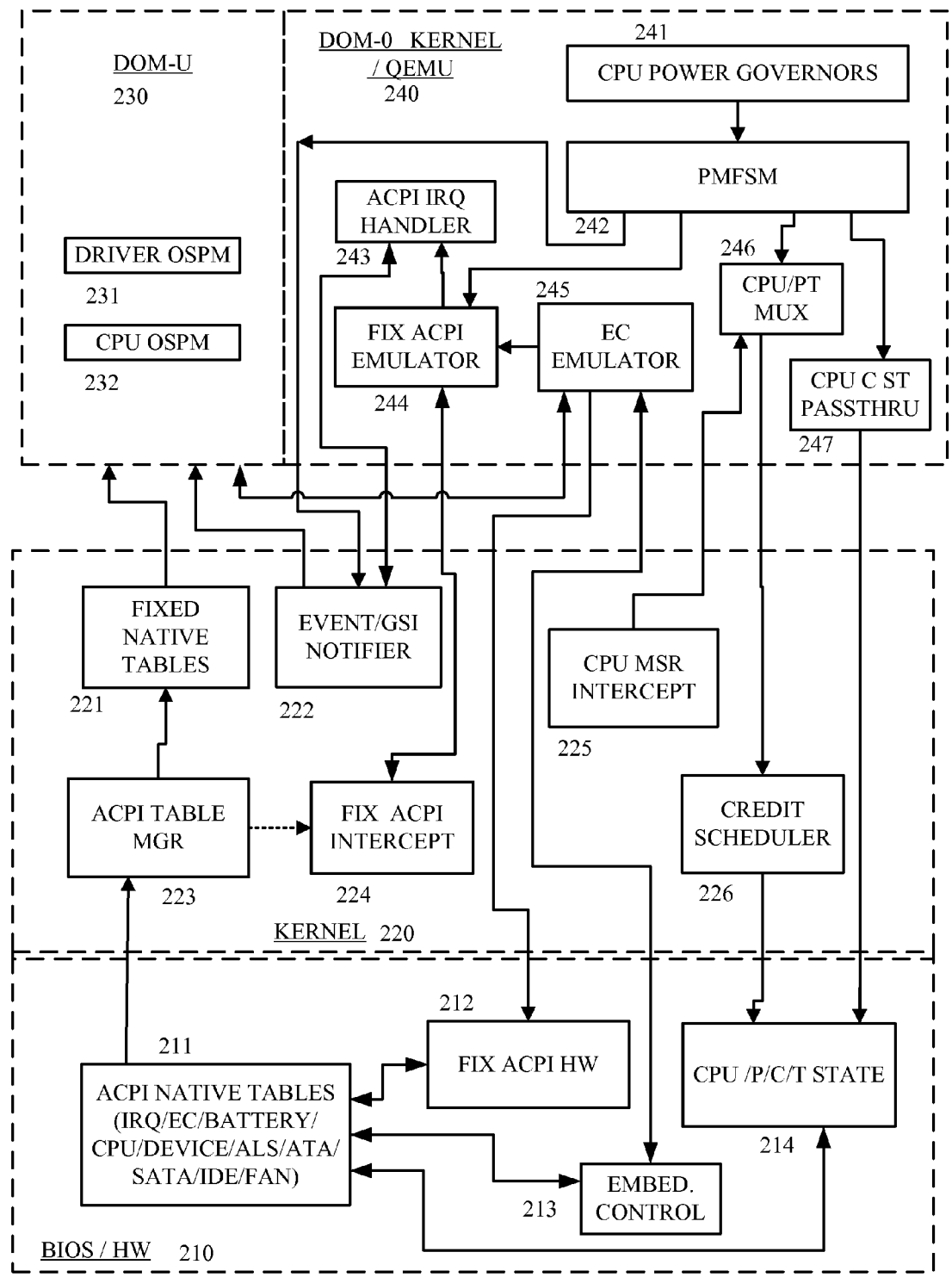
FIG. 3 is a block diagram that shows the HPM (hierarchical power management) system architecture according to an exemplary embodiment of the present invention.

FIG. 3 is a block diagram that shows a HPM (hierarchical power management) system architectural structure 200 of software and firmware components according to the present invention. FIG. 3 does not represent layout order or even juxtaposition in physical memory or memory addresses; rather, it illustrates logical software and firmware architectural interrelationships in an exemplary embodiment of the invention.

Components shown in FIG. 3 include: a DOM-U 230 comprising within it a driver OSPM 231, and a CPU OSPM 232.

Device drivers and OSPM in CPU control within DomU can be, and often are, in effect a black box since the implementation is typically not open source and control of behavior is nor fully available to hypervisor implementers.

Also shown in FIG. 3 is a DOM-0 kernel comprising a component QEMU subsystem 240. Within the DOM-0 kernel/QEMU subsystem may be found software (rarely firmware) subsystem components including:—

CPU Power Governors 241, a form of device driver for hardware control of power features, PMFSM 242 (Power Management Policy Finite State Machine), a higher level control (state machine) to drive overall power management by policy prescription, ACPI IRQ (interrupt request) Handler 243 which serves to dispatch and/or virtualize IRQ interrupts, FIX ACPI EMULATOR 244 for providing surrogate ACPI information to any requesting VM, EC (embedded controller) Emulator 245, this provides virtualization and emulation of features traditionally provided by an Embedded Controller chip (for example, AAEON® AEC-6905), CPU passthru MUX (multiplexer) 246, for multiplexing pass-thru (non-virtualized) device services, CPU "C-State" Passthru 247 service (C-State is well-known in the ACPI arts to refer to CPU Power State). Pass-through (or Passthru) is well-known in the hypervisor arts.

The PMFSM 242 (Power Management Policy Finite State Machine) is particularly important subsystem; but is not especially a critical feature of the present invention. The PMFSM 242 maintains HPM (Hierarchical Power Management) policy data (such as for CPU/Battery/Device/ALS (Ambient Light Sensor)).

Further shown in FIG. 3 is a Kernel 220 such as may be embodied with the Hypercore™ BIOS (basic input-output system) product from Phoenix Technologies® Inc. Included within kernel 220 are the following components:

Fixed (modified) Native Tables 221 as extended from ACPI table definitions, primarily by multiplication for virtualization vectors, Event/GSI (Global System Interrupt) Notifier 222, a general purpose event dispatcher, Global System Interrupts are well-known in the art.

ACPI Table Manager 223, which maintains virtualized and non-virtualized versions of tables (eg FADT) as defined by the ACPI specification, Fixed (virtualized/updated) ACPI Intercept routine 224, to redirect ACPI messages generally, CPU MSR Intercept routine 225, for processor's power management model-specific registers, Credit Scheduler 226. In an exemplary embodiment, the Xen® credit scheduler program is used as the credit scheduler 226. Credit schedulers are well known in the Xen® hypervisor implementations.

Further shown in FIG. 3 is a BIOS/Hardware subsystem 210 and included within it are a number of components which are implemented largely in firmware:

ACPI Native Tables 211, these are data tables of which BIOS is aware, as inferred above and as defined in the ACPI specification.

Fix (run-time modified) ACPI hardware tables 212, to support multiple versions per VM for virtualization purposes.

Embedded Controller Support 213, basically a device driver emulator and/or virtualization subsystem for Embedded Controller chip(s).

CPU P, C and T State supporting firmware 214. P, C and T States are as defined in the ACPI specification.

Figure 4:
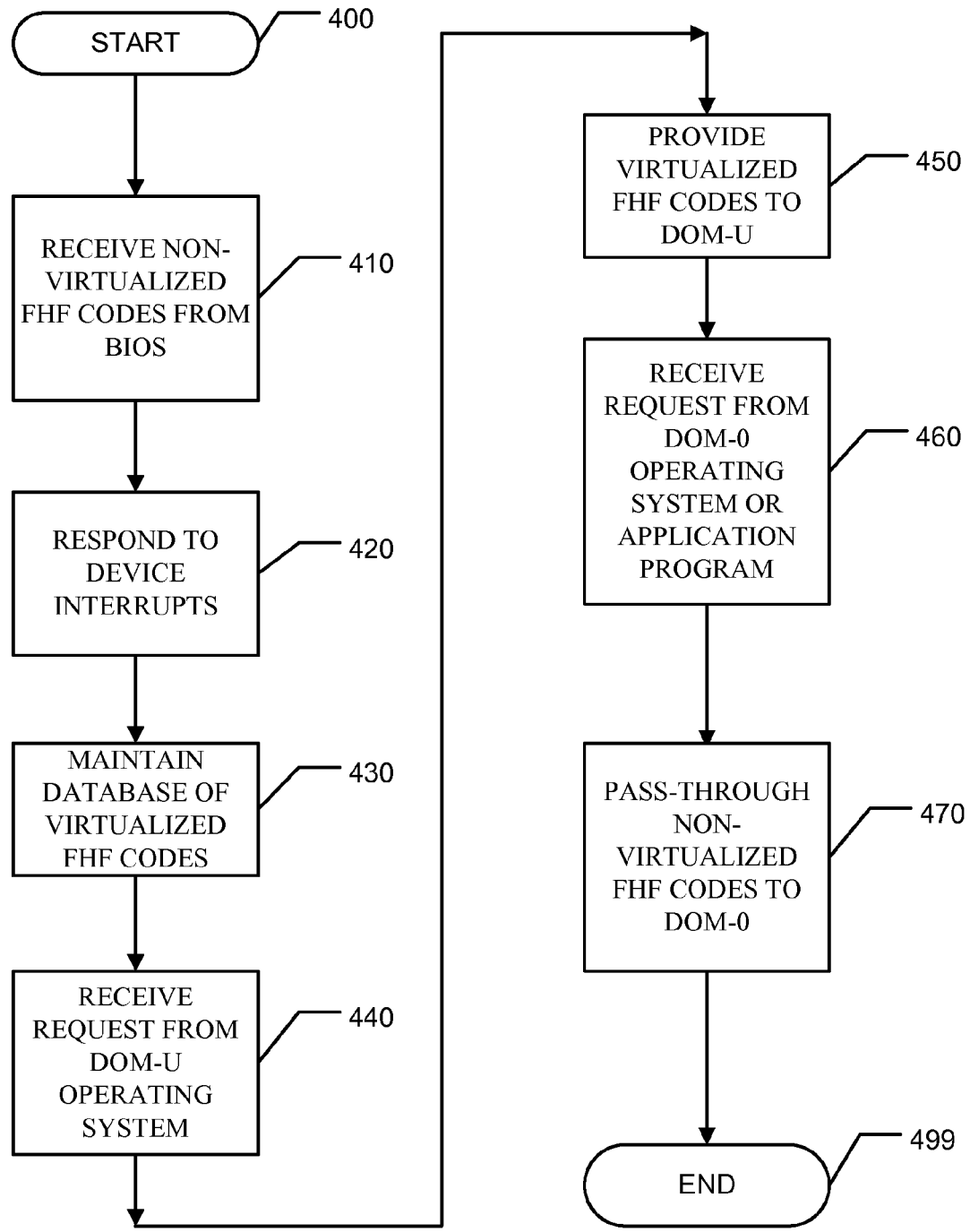
FIG. 4 is a flowchart that shows steps performed when implementing an exemplary embodiment of the present invention.

FIG. 4 is a flowchart illustrating the steps performed in implementing an approach to hierarchical power management according to the present invention. The process starts at step 400 and continues through step 499. Some of the boxes represent steps within an embodiment of the invention; others may represent acts that may be part of such steps.

At step 410, ACPI FHF (Fixed Hardware Feature(s)) codes are requested from BIOS and received. This may be accomplished within the ordinary scope of ACPI protocols. For example an ACPI Table manager (223 in FIG. 3) may obtain the necessary information from the ACPI native tables (211 in FIG. 3).

An ACPI Table Manager may have multiple functions, described by way of example rather than limitation within the general scope of the invention. In an embodiment of the invention, ACPI TM (Table Manager) is implemented as part of an HMV (hypervisor virtual machine) loader.

ACPI TM may pass substantially an entire native ACPI Table to a DomU while a generic ACPI Table is maintained by ROMBIOS (Read-Only Memory Basic Input-Output System) and is replaced with (a copy of) a native ACPI table. The use of tables in this way facilitates usage of ACPI functionality whenever devices are used in Pass-Through mode by a VM, especially in DomU. An exception may be the FACS (Firmware ACPI Control Structure) which must be virtualized because it is used in S3/S4 resume. DSDTs (Differentiated System Description Tables) and SSDTs (Secondary Subsystem Description Tables) may reside in memory made visible as E820 ACPI reserved areas, such pages being presented to at least one DomU. E820 memory services are well-known in the art. Whenever native ACPI tables are exposed to a DomU it consequently becomes necessary to "hide" those resources for which emulated drivers are applied (for example Embedded Controller resources).

Thus, still with regard to the same exemplary embodiment of the invention, an ACPI TM may do the following:—Firstly, read actual ACPI DSDTs and SSDTs and patch them into ROMBIOS supervised structures. SSDTs (Secondary System Description Tables) are in effect a continuation of a corresponding DSDT. Secondly, selectively Add/Delete SSDTs from ROMBIOS Table(s) as may be needed. Thirdly, record ACPI Fixed Address I/O information from a FADT for interception from a DomU. Fourthly and lastly, fix up (locate, instantiate and apply virtualization and/or optionally remedial modification to) the FADT for ACPI Fixed HW Emulation.

At step 420, interrupts are handled such as by an ACPI IRQ (interrupt request) handler (243 in FIG. 3). This may involve access to hardware or fixed ACPI hardware information supplied from the BIOS (for example 212 in FIG. 3). Also an event notifier for GSI (global system interrupts) may be invoked (such as 222, FIG. 3) so that the corresponding event may be serviced in DomU. The use of (especially hardware-oriented) interrupt-driven events is typical but not exhaustive.

IRQ handling and routing may commonly be a key part of HPM (hierarchical power management), however it is not the only important facility in ACPI Fixed HW Emulator/ACPI Interrupt Handler even though the exemplary embodiment of the invention features it centrally. Typically, all I/O Accesses falling in ACPI FHF (especially Fixed HW space) may be intercepted by Hypervisor and presented to ACPI Fixed HW Emulator/ACPI Interrupt Handler. Events relating to Platform Sleep State transitions will typically be multiplexed to and from DomU. Not all events arise out of interrupts, even though many or most do.

This approach allows for deferment of actual transitions, especially platform Sleep State transitions wherever necessary or desirable. It also allows for making notifications to other Domains about imminent or incipient transitions so that timely and appropriate action may be taken in response. Moreover, facilitated are surrogated (substituted or fabricated) ACPI Enable/Disable operations for DomU, management of virtualized ACPI Timer(s) for DomU, management of ACPI Status/Control and Event Registers, and the like.

In particular, in an embodiment, IRQ9 events from the ACPI IRQ9 handler may be routed to Dom0 with high level notifications and dispatched as GSI(s) to other Doms, especially a single DomU by the ACPI Event Notifier (such as that provided in Phoenix® HyperCore™).

Still referring to FIG. 4, at step 430, a database or array or set of tables of virtualized FHF (especially FFH) codes is maintained responsive to the information as described in regards to steps 410 and 420, above. This action may be performed in the Dom0 kernel space by the ACPI TM (223 in FIG. 3) and the databases etc. of information may be stored in fixed native tables (221, in FIG. 3) and fixed ACPI intercept information (224 in FIG. 3), and optionally elsewhere also.

At step 440, a power management request may be received from Dom-U (such as from Driver OSPM 231 or CPU OSPM 232, both in FIG. 3). Response(s) to the request are virtualized and at step 450 virtualized FHF codes may be provided to Dom-U from the fixed native tables (221, in FIG. 3), especially those that were created and/or maintained in step 430. In practice, through use of an ACPI Event Notifier a richness of features may be provided to a DomU.

In an embodiment of the invention, ACPI dispatched events may be processed by a Fixed HW Emulator and an EC Emulator over to DomU using GSIs. From a DomU perspective, this mechanism is used for communicating virtual (or sometimes actual) machine sleep states to a DomU. Native ACPI supports many types of events such as OS transparent events, Hardware events and Interrupt events. GSI events may conditionally be passed to DomU. Such GSIs may all be mapped through ROM BIOS AML code.

Hardware system interrupt events may cause execution of an event handler (through AML code or a specific ACPI-aware driver), that allows the software to make a policy decision responsive to the (type of) event. In a case of ACPI fixed-feature events, OSPM or an ACPI-aware driver may act as the pertinent event handler. In a case of generic logic events, OSPM may schedule the execution of an OEM-supplied AML control method that is expressly associated with the relevant event. Legacy (old) systems may use SMI to propagate OS transparent events and native ACPI logic may remap SMI to SCI (a system control interrupt which is an OS-visible interrupt triggered by a hardware power management event).

Legacy hardware events including device idle-timers, power-button, lid switch, thermal and Power Management event timer may be mapped to one or more GSI on case-by-case basis. The native platform (Dom0 implemented) may abstract great deal of event handling, so to DomU a much simplified model may be presented. Thermal, battery, and other HW events could transferred to DomU, but the utility is marginal. Native ACPI compliant OS can perform mapping based on legacy or non-legacy events. In HyperCore™ mode, most events may be transferred as previously remapped GSIs.

By implementing as described above, DomU—exposed events can implement any ACPI events handled natively in Dom0. This enables Dom0 based OS systems to succeed in hardware-oriented quality/compatibility tests. Even though such tests can be of dubious actual value in modern (virtual) systems for their stated purpose, nonetheless compliance therewith if often commercially important.

At step 460, optionally responsive to HPM (hierarchical power management) policy (242 in FIG. 3) ACPI conforming requests, such as related to S, P, C or T States may be made in a Dom0 context and handled by FFH (such as 214, FIG. 3). Such requests may typically come from an application or OS condition in Dom0. Examples of such requests might arise, for example, out of a user request for platform shutdown or detection of a critically low battery voltage.

In some cases other subsystems may interpose actions and requirements, for example the Xen Credit scheduler (226, FIG. 3) made be required for tracking time of most recent usage.

At step 470 the BIOS may provide native ACPI hardware codes and those, or in the alternate, non-virtualized FFH codes may be passed through to Dom0. Or a blend of each may be passed through. At box 499 the method is completed. By means of the techniques described above, a valuable blend of concurrent pass-through and virtualization of corresponding or identical resources is achieved, among other benefits.

Figure 5:
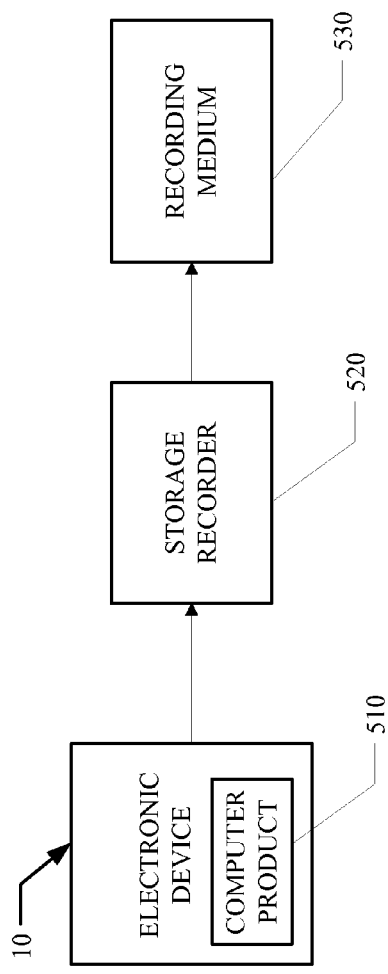
FIG. 5 shows how an exemplary embodiment of the present invention may be encoded onto a computer readable medium or media.

FIG. 5 shows how an exemplary embodiment of the present invention may be encoded onto a computer readable medium or media. As illustrated in FIG. 5, computer instructions to be incorporated into in an electronic device 10 may be distributed as manufactured firmware and/or software computer products 510 using a variety of possible computer readable media 530, for example CD (Compact Disc) or PROM (Programmable Read-Only Memory), having the instructions recorded thereon such as by using a storage recorder 520. Often in products as complex as those that deploy and implement the present invention, more than one medium may be used; both in distribution and in manufacturing relevant product. Only one medium is shown in FIG. 5 for clarity but more than one medium may be used and a single computer product may be divided among a plurality of media.

Figure 6:
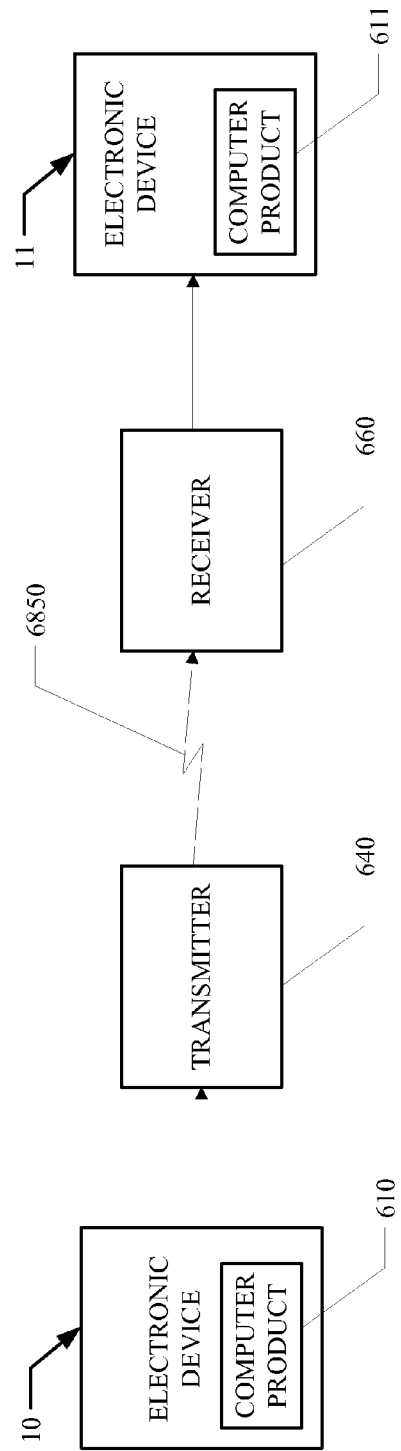
FIG. 6 shows how an exemplary embodiment of the present invention may be encoded, transmitted, received and decoded using electro-magnetic waves.

FIG. 6 shows how an exemplary embodiment of the invention may be encoded, transmitted, received and decoded using electro-magnetic waves. As illustrated in FIG. 6, additionally, and especially since the rise in Internet usage, computer program products 610 may be distributed by encoding the corresponding instructions into signals modulated as a wave. The resulting waveforms may then be transmitted by a transmitter 640, propagated as tangible modulated electro-magnetic carrier waves 650 and received by a receiver 660. The carrier waves may be impressed on a metallic or non-metallic pre-formed medium, such as a copper conductor, or may be carried wirelessly through an atmospheric medium such as air. Upon reception, they may be demodulated and the signal decoded into a further version or copy of the computer product 611 in a memory or other storage device that is part of a second electronic device 11 and typically similar in nature to electronic device 10. Other topologies and/or devices, for example, Internet Protocol routers and cables thereto may also be used to construct alternative embodiments of the present invention as is well-known.

The embodiments described above are exemplary rather than limiting and the scope and bounds of the present invention should be determined from the claims. Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method of managing a computing platform comprising:

maintaining a plurality of virtualized FHF (fixed hardware feature(s)) codes responsive to a plurality of device interrupts and further responsive to a plurality of non-virtualized FHF codes;

providing the plurality of virtualized FHF codes responsive to a first request from a first operating system;

providing pass-through access to the plurality of non-virtualized FHF codes responsive to a second request from a second operating system; and setting a power mode of hardware running the computing platform to be a more active state than that reported by the virtualized FHF codes to the first operating system, if the second request requests the more active state and the first request requests a less active state.

2. The method of claim 1 further comprising operating a hypervisor to control the first and second operating systems and wherein:

the first operating system runs in an unprivileged domain and the second operating system runs in a privileged domain.

3. The method of claim 1 wherein the virtualized FHF are FFH (Functional Fixed Hardware).

4. The method of claim 2 wherein the steps of the virtualized FHF are FFH (Functional Fixed Hardware).

5. The method of claim 1 further comprising:

operating an ACPI (Advanced Configuration and Power Interface) fixed hardware emulator to respond to ACPI events by deferring S-state (Sleep state) transitions and to maintain a virtualized ACPI timer for the first operating system.

6. The method of claim 1 wherein the first request is a power management request.

7. The method of claim 1 wherein the first operating system is in an unprivileged domain and the second operating system is in a privileged domain.

8. The method of claim 7 wherein a requested or incipient change in ACPI (Advanced Configuration and Power Interface) S-state arising in the unprivileged domain causes an event in the privileged domain.

9. The method of claim 8 wherein the event is a GSI (global system interrupt).

10. The method of claim 5, wherein the ACPI fixed hardware emulator is to respond to the ACPI events by deferring S-state (Sleep state) transitions.

11. The method of claim 1, wherein the non-virtualized FHF codes report a state of the hardware to the second operating state that is same as an actual state of the hardware.

12. A tangible, non-transitory computer-readable storage medium storing instructions that, if executed by a processor to operate for interrupt handling, cause the processor to:

maintain a plurality of virtualized FHF (fixed hardware feature(s)) codes responsive to a plurality of device interrupts and further responsive to a plurality of non-virtualized FHF codes;

provide the plurality of virtualized FHF codes responsive to a first request from a first operating system;

provide pass-through access to the plurality of non-virtualized FHF codes responsive to a second request from a second operating system; and set a power mode of hardware running the computing platform to be at a more active state than that reported by the virtualized FHF codes to the first operating system, if the second request requests the more active state and the first request requests a less active state.

13. The storage medium of claim 12, wherein the non-virtualized FHF codes report a state of the hardware to the second operating state that is same as an actual power state of the hardware.

14. An electronic device comprising:
   a controller; and
   a memory having instructions encoded therein, the instructions when executed by the controller cause said controller to operate for power management by steps comprising the acts of:
   maintaining a plurality of virtualized FHF (fixed hardware feature(s)) codes responsive to a plurality of device interrupts and further responsive to a plurality of non-virtualized FHF codes;
   providing the plurality of virtualized FHF codes responsive to a first request from a first operating system;
   providing pass-through access to the plurality of non-virtualized FHF codes responsive to a second request from a second operating system; and
   setting a power mode of hardware running the computing platform to be at a more active state than that reported by the virtualized FHF codes to the first operating system, if the second request requests the more active state and the first request requests a less active state.

15. The electronic device of claim 14, wherein the non-virtualized FHF codes report a state of the hardware to the second operating state that is same as an actual state of the hardware.

\* \* \* \* \*

UNITED STATES PATENT AND TRADEMARK OFFICE
CERTIFICATE OF CORRECTION

| | | |
|---|---|---|
| PATENT NO. | : 8,799,691 B2 | Page 1 of 1 |
| APPLICATION NO. | : 12/544900 | |
| DATED | : August 5, 2014 | |
| INVENTOR(S) | : Gaurav Banga et al. | |

It is certified that error appears in the above-identified patent and that said Letters Patent is hereby corrected as shown below:

In the Claims

In column 10, line 11, in Claim 1, after "be" insert -- at --.

Signed and Sealed this
Eighteenth Day of November, 2014

Michelle K. Lee
*Deputy Director of the United States Patent and Trademark Office*